United States Patent
Grammel

(10) Patent No.: US 6,449,258 B1
(45) Date of Patent: Sep. 10, 2002

(54) INTERMEDIATE REPEATER FOR A COMMUNICATION NETWORK FOR THE RECEPTION AND FORWARDING OF FREQUENCY MULTIPLEXED SIGNALS

(75) Inventor: Gert Grammel, Uhingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/207,607

(22) Filed: Dec. 9, 1998

(30) Foreign Application Priority Data

Dec. 10, 1997 (DE) .......................................... 197 54 785

(51) Int. Cl.⁷ .............................................. G01R 31/08
(52) U.S. Cl. ...................... 370/246; 370/481; 370/501; 359/123
(58) Field of Search ................................ 370/498, 501, 370/502, 241, 242, 243, 246, 267, 492, 497, 481; 359/125, 123, 115, 154

(56) References Cited

U.S. PATENT DOCUMENTS

| | | | |
|---|---|---|---|
| 3,617,657 A | * 11/1971 | Brewer | 370/243 |
| 3,629,523 A | * 12/1971 | Chalhoub | 370/246 |
| 3,761,914 A | 9/1973 | Hardy et al. | |
| 3,816,673 A | * 6/1974 | Miya | 174/70 S |
| 4,412,245 A | 10/1983 | Kwok | |
| 4,633,459 A | * 12/1986 | Blackburn | 370/243 |
| 5,343,240 A | 8/1994 | Yu | |
| 5,425,027 A | 6/1995 | Baran | |
| 5,519,434 A | 5/1996 | Fasquel | |
| 5,793,506 A | * 8/1998 | Schmid | 359/125 |
| 6,236,664 B1 | * 5/2001 | Erreygers | |

FOREIGN PATENT DOCUMENTS

| | | |
|---|---|---|
| DE | 0 612 188 A1 | 8/1994 |
| DE | 197 02 350 A1 | 7/1997 |
| DE | 297 11 961 U1 | 10/1997 |
| DE | 197 06 070 A1 | 8/1998 |

* cited by examiner

Primary Examiner—Douglas Olms
Assistant Examiner—Ricardo M. Pizarro
(74) Attorney, Agent, or Firm—Sughrue Mion, PLLC

(57) ABSTRACT

An intermediate repeater that can make available at least a minimum of information to the end user sites connected with it even in the event of a power failure. The intermediate repeater has a broadband amplifier (AMP) for the amplification of the received broadband signals and for the subsequent forwarding of the amplified broadband signals, as well as a first device (HP1, LP1; S1,LP, C1), which is connected in series to the broadband amplifier (AMP) and is set to separate the received narrow band signals from the received broadband signals according to frequency, and to forward them without amplification by bypassing the broadband amplifier (AMP). Thus, the transmission of the narrow band signals is guaranteed even during a disturbance.

20 Claims, 3 Drawing Sheets

INTERMEDIATE REPEATER FOR A COMMUNICATION NETWORK FOR THE RECEPTION AND FORWARDING OF FREQUENCY MULTIPLEXED SIGNALS

BACKGROUND OF THE INVENTION

The invention involves an intermediate repeater for a communication network for the reception and forwarding of frequency multiplexed signals, and particularly for the reception and forwarding of frequency multiplexed signals from broadband signals and narrow band signals with a broadband amplifier (AMP) for the amplification of the received broadband signals and for the subsequent forwarding of the amplified broadband signals.

Frequency multiplexed signals are, for example, merged together from broadband and narrow band signals. The broadband and narrow band signals are, as a rule, transmitted within different frequency ranges.

In communication networks, as known for example from U.S. Pat. No. 5,343,240, broadband signals, for example distribution signals such as cable television signals, as well as narrow band signals, for example bi-directional signals such as for cable telephony, are transmitted over a common line. The distribution signals and the bi-directional signals are separated from one another according to frequency, so that they are separated in the receiver by passive filters, for example a high-pass filter for cable television signals and a low-pass filter for cable telephony, and can be fed, for example, to a television, or a telephone modem. On the transmission lines, the distribution signals and the bi-directional signals are amplified in the bi-directional intermediate repeaters. If an intermediate repeater fails, for example because of a power failure, a multitude of end users can neither receive television signals, nor make telephone calls.

SUMMARY OF THE INVENTION

It is therefore an objective of the present invention to create an intermediate repeater that can make available at least a minimum of information to the end user sites connected with it even in the event of a is power failure or a failure of the amplification elements.

This objective is resolved according to the invention by an intermediate repeater which includes a first device (HP1, LP1; C1; S1; MAX1) that is connected in series with the broadband amplifier (AMP) and is set to forward the received narrow band signals without amplification by bypassing the broadband amplifier (AMP).

The intermediate repeater according to the invention distinguishes itself in particular by containing a device that can perform a separation by frequency of the received multiplex signals into broadband and narrow band signals, through which, a forwarding of at least a portion of the received signals—namely the narrow band signals, which are not subject to quality requirements as stringent as those for the broadband signals—is possible, in the event of a failure of the power supply, or other operational disturbance, of the intermediate repeater.

Narrow band signals, as a rule, are modulated with a known modulation process that is more resistant to interference than the modulation process that is used for the broadband signals. In the event of a failure of an intermediate repeater according to the invention, the is narrow band signals, if necessary, are sent out by the signal source with a strengthened transmission level in order to reroute the line to the next intermediate repeater without substantial attenuation loss. Essentially, with the invention, a telephone connection can also be established and maintained during a failure of an intermediate repeater.

In a preferred embodiment of the invention, a unidirectional amplifier can be used instead of a bi-directional one. This lowers the installation costs as well as the operating costs.

In another embodiment, through exclusive amplification of the broadband signals, the bandwidth to be amplified is smaller, which results in a cost saving in the production of the amplifier, since the linearity requirements of the amplifier can be reduced.

BRIEF DESCRIPTION OF THE DRAWING

The invention will be more clearly understood with reference to the following description in conjunction with the accompanying drawing, in which.

DETAILED DESCRIPTION OF THE INVENTION

Figure 1:
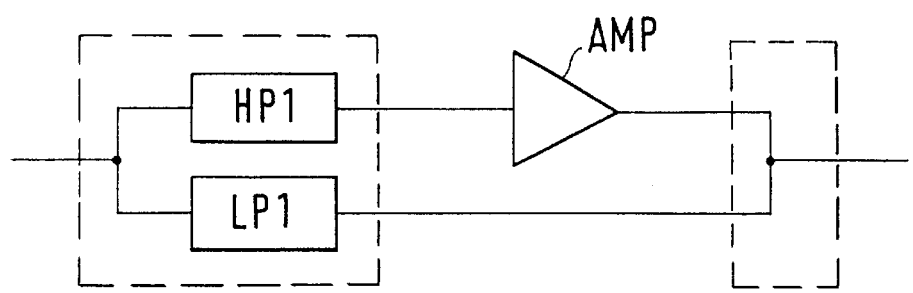
FIG. 1 is a schematic illustration of a first embodiment of an intermediate repeater according to the invention.

The first embodiment is now explained with the aid of FIG. 1. FIG. 1 shows an intermediate repeater for a communication network for the reception and forwarding of frequency multiplexed signals from broadband signals and narrow band signals with a broadband repeater AMP for the amplification of the received broadband signals and for the subsequent forwarding of the amplified broadband signals.

In the communication network, electrical frequency multiplexed signals are transmitted by a transmitter unit over a transmission line consisting of coaxial cable lines and several intermediate repeaters connected in series to a multitude of end user sites.

The electrical frequency multiplexed signals contain as broadband signals, for example cable television signals, and as narrow band signals, for example cable telephone signals. Thus unidirectional distribution signals (the cable television signals) are transmitted by the transmitter unit to the end user sites over one and the same coaxial cable as well as bi-directional signals (the cable telephone signals) between the transmitter unit and the end user sites. Cable television signals and cable telephone signals are transmitted simultaneously, yet in different frequency ranges. A higher requirement for quality is placed on the cable television signals than is placed on cable telephone signals. The cable telephone signals, moreover, are transmitted with a modulation process that is more resistant to interference than the modulation process for the cable television signals. For this reason, it is possible to forward the cable television signals amplified and the cable telephone signals without amplification in all intermediate repeaters, or only in a few, without losses in quality for the end user. An intermediate repeater contains a broadband amplifier as an active component. The intermediate repeater in FIG. 1 has a broadband amplifier AMP that only amplifies the broadband cable television signals. It therefore requires a smaller bandwidth than a typical amplifier, which must at the same time also amplify the cable telephone signal. Moreover, only a unidirectional, broadband amplifier AMP is required and not a bi-directional one, since the cable television signals are only transmitted from the transmitting unit to the end user sites, but not in the reverse direction.

The intermediate repeater in FIG. 1 contains a first device HP1, LP1 which is connected in series to the broadband amplifier AMP and is set to separate the received narrow band signals from the received broadband signals by frequency and to forward them without amplification by bypassing the broadband amplifier AMP.

The first device HP1, LP1 is also set to execute a time-independent distribution by frequency of the received frequency multiplexed signals into broadband signals (here cable signals) and narrow band signals (here cable telephone signals).

The narrow band cable telephone signals at the broadband amplifier are thus directed in the direction from the transmitting unit to the end user sites, as well as in the reverse direction from the end user sites to the transmitter unit. A reason for this measure is, that in the event of a failure or disturbance in the broadband amplifier AMP, a telephone connection should nevertheless be able to be maintained and re-established. The transmission of the cable television signals in the intermediate repeater is independent of the transmission of the cable telephone signals, and as will be further shown below, the transmission of the cable telephone signals is only influenced by passive components, which work without a power supply.

The intermediate repeater in FIG. 1 also contains a second device for bringing together the amplified broadband signals and the narrow band signals according to frequency. This device, in the simplest case, is a merging of two coaxial cables.

The first device HP1, LP1 contains a first passive high-pass filter HP1, which is set to forward the broadband signals received from the transmitting unit. The broadband cable television signals are transmitted in a frequency range whose frequencies are higher than those of the frequency range in which the narrow band cable telephone signals are transmitted. Thus, the cable telephone signals are transmitted from the end user sites to the transmitter unit, for example in the frequency range from 30 MHz to 60 MHz, the cable telephone signals are transmitted from the transmitter unit to the end user sites, for example in the frequency range from 70 MHz to 100 MHz, and the cable television signals are transmitted in the frequency range from 300 MHz to 800 MHz.

The limit frequency of the high-pass filter is then to be selected in the range greater than 100 MHz and less than 300 MHz.

The first device HP1, LP1 also contains a first passive low-pass filter LP1, which is set to forward the received narrow band signals and to suppress the forwarding of the received broadband signals. In the above numerical example, the limit frequency of the low-pass filter LP1 is likewise to be selected in the range greater than 100 MHz and less than 300 MHz, but with the restriction: that it should also still be under the limit frequency of the high-pass filter, with which, in the later merging of the amplified cable television signals and the non-amplified cable telephone signals, no unnecessary noise results from the superposition of frequency components that overlap one another.

The first passive high-pass filter HP1 and the broadband amplifier AMP are connected in series. The first passive low-pass filter LP1 is arranged parallel to the series connection from the first passive high-pass filter HP1 and broadband amplifier AMP. Thus the received broadband signals are forwarded amplified and the received narrow band signals are forwarded without amplification. The signal flow of the broadband cable television signals and the narrow band cable telephone signals is as follows:

From the transmitter out, cable television signals and cable telephone signals are transmitted to the intermediate repeater from FIG. 1. Both signals are fed to the first device HP1, LP1. The high-pass filter HP1 forwards only the cable television signals, and the low-pass filter LP1 forwards only the cable telephone signals. The cable television signals are amplified in the broadband amplifier AMP connected in series and then fed to second device. The cable telephone signals are fed over a coaxial cable line directly to the second device without amplification. In the second device, the amplified cable television signals and the non-amplified cable telephone signals are superimposed and then fed together to the output of the intermediate repeater, from which they are forwarded out to the end user sites.

Cable telephone signals that come from end user sites and are to be transmitted to the transmitter unit, pass through the output of the intermediate repeater, through the second device and the passive low-pass filter LP1, which is bi-directionally active and has the same filter characteristics in both directions, to the input of the intermediate repeater from which the cable telephone signals are forwarded out to the transmitter unit.

Figure 2:
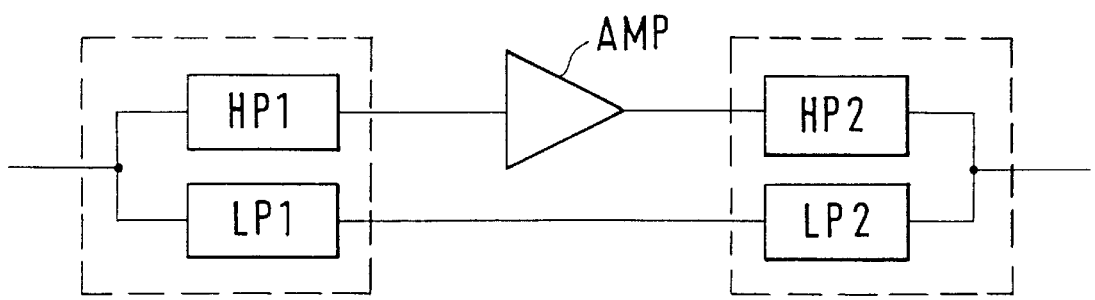
FIG. 2 is a schematic illustration of a second embodiment of an intermediate repeater according to the invention.

The second embodiment is then explained with the aid of FIG. 2. FIG. 2 shows an intermediate repeater, which is equivalent in its structure and mode of operation to the intermediate repeater described at FIG. 1, with the difference, that the second device is configured differently.

The second device HP2, LP2 contains a second passive high-pass filter HP2, which is set to forward broadband signals and to suppress the forwarding of narrow band signals. The second passive high-pass filter HP1 has the same filter characteristics as the first high-pass filter HP1. It is used to prevent the cable telephone signals that were transmitted by the end user sites, the cable telephone signals that were forwarded from the first device and any low frequency interference from arriving at the output of the broadband amplifier AMP.

The second device HP2, LP2 also contains a second passive low-pass filter LP2 that is set to forward narrow band signals and to suppress the forwarding of broadband signals, and which is connected in series with the first low-pass filter LP1. The second low-pass filter LP2 has the same filter characteristic as the first low-pass filter LP1. It is used to prevent the amplified cable television signals and any high frequency interference from arriving at the first device HP1, LP1.

Figure 3:
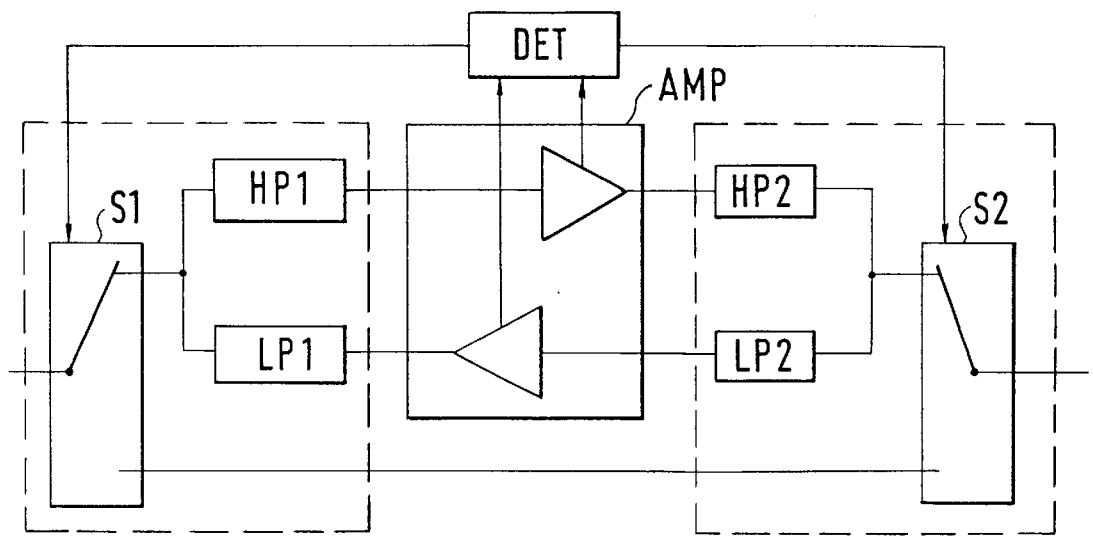
FIG. 3 is a schematic illustration of a third embodiment of an intermediate repeater according to the invention.

The third embodiment is explained with the aid of FIG. 3. FIG. 3 shows an intermediate repeater that is equivalent in its structure and its mode of operation to the intermediate repeater described in FIG. 2, with the difference that the broadband amplifier AMP is configured differently and, in addition, a detector DET and two switches S1, S2 are provided.

The broadband amplifier AMP is then a bi-directional amplifier. It is also used to amplify the narrow band signals, in addition to the broadband signals. Furthermore, a bi-directional broadband transmission can be supported by the broadband amplifier AMP, in the case where the amplifier is amplified in both directions. The broadband signals then are not just transmitted, as before, exclusively from the transmitter unit to the end user sites, but also the reverse. For this purpose, the frequency range, for example, is segmented such that the range from 300 MHz to 800 MHz is reserved for the direction from the transmitter unit to the end user sites and the range from 100 MHz to 300 MHz for the direction from the end user sites to the transmitter unit. The limit frequencies for the high-pass and low-pass filters HP1, HP2, LP1, LP2 are selected, then, at 300 MHz. The broadband signals, then, contain, for example, picture signals for picture telephony or data signals for broadband internet access.

The job of the second device HP2, LP2 is to feed the broadband and narrow band signals received from the end user sites to the broadband, bi-directional amplifier AMP.

For the broadband signals, video signals, for example in a video-on-demand system, can also be transmitted instead of, or in addition to, the cable television signals. For the bi-directional signals, data signals, for example for data communications between networked computers, can also be transmitted instead of, or in addition to, the voice signals.

The first device HP1, LP1, S1 also contains another switch S1. The second device HP2, LP2, S2 also contains another switch S2. The detector DET monitors the amplification elements of the amplifier AMP and triggers the switches S1 and S2, depending on the result of the monitoring. Both switches S1 and S2 each have two settings and are linked such that in the one setting they activate a signal connection through the high/low-pass filter LP1, HP1, the amplifier AMP and the high/low-pass filter LP2, HP2, and in the other setting activate a direct connection between the switches S1 and S2. If, for example, the signal level of the one output of the amplifier AMP is below a predetermined threshold, for example because of a power failure, then this is detected by the detector DET, whereupon the switches S1 and S2 are triggered such that the direct connection between the two switches S1 and S2 is activated in order to at least cause a non-amplified forwarding of the signal. If the detector fails, then the switches S1 and S2 automatically activate the direct connection, in a manner comparable to a relay.

Figure 4:
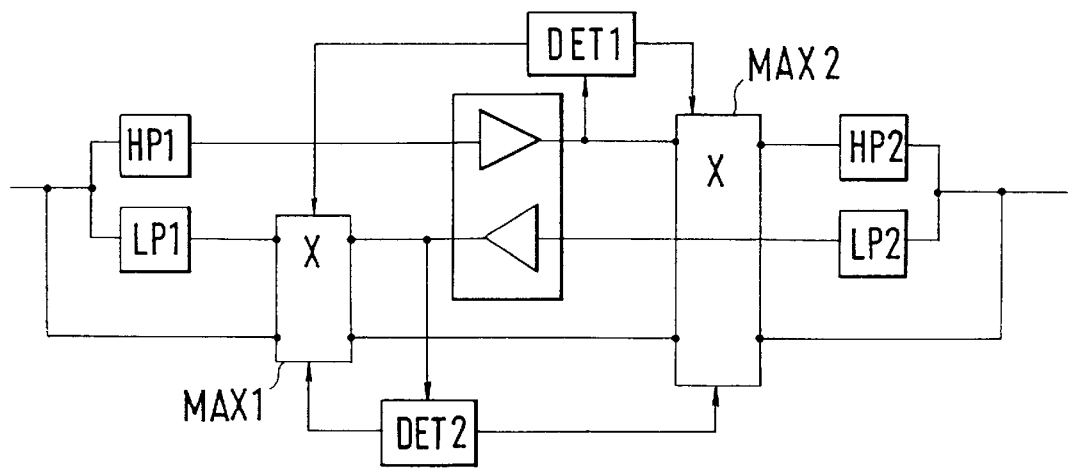
FIG. 4 is a schematic illustration of a fourth embodiment of an intermediate repeater according to the invention.

The fourth embodiment is then explained with the aid of FIG. 4. FIG. 4 shows an intermediate repeater for a communication network, as described in FIG. 3, with the difference that two detectors DET1, DET2 are provided and two 2×2 matrices MAX1, MAX2 are provided instead of the switches S1 and S2. Each detector DET1, DET2 monitors an output of the amplifier AMP and controls both 2×2 matrices MAX1, MAX2. Each matrix MAX1, MAX2 is configured such that any input can be interconnected with any output. Three signal paths are thus provided. The first signal path is provided for the transmission of the broadband and narrow band signals from the transmitter unit to the end user sites. The second signal path is provided for the transmission of the broadband and narrow is band signals from the end user sites to the transmitter unit. The third signal path is provided in order to be able, in the event of a disturbance in the first and/or second signal path, to transmit the broadband and narrow band signals of the particular signal path subject to interference, or both signal paths, over an alternative route. If, for example, a disturbance is detected by the detector DET1 in the first signal path, then the matrices MAX1, MAX2 are triggered, so that the broadband and narrow band signals from the transmitter unit to the end user sites are rerouted over the alternative third signal path and forwarded without amplification. If the disturbance that was detected by the detector DET1 is cleared up, then the first signal path can be activated again. The same goes for a disturbance detected in the second signal path by detector DET2. The triggering of the matrices MAX1, MAX2 occurs, for example in relation to the third signal path over an ODER [or] link of the outputs of the detectors DET1, DET2.

Figure 5:
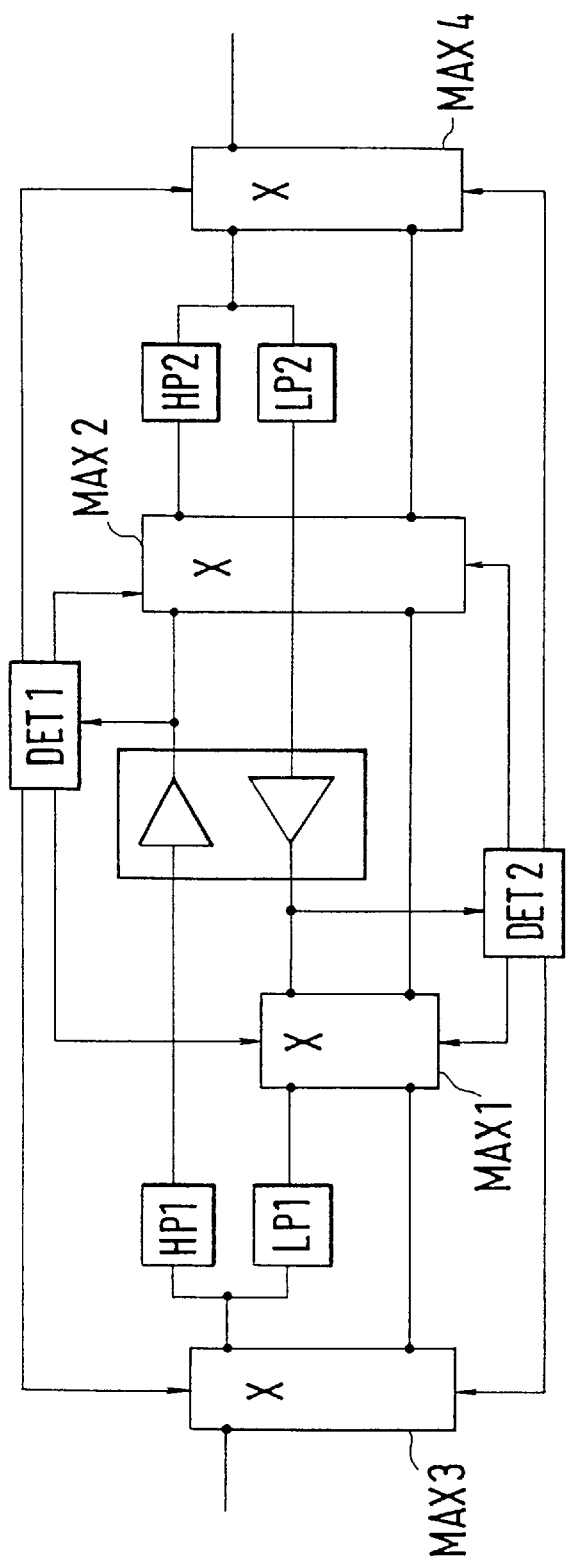
FIG. 5 is a schematic illustration of a fifth embodiment of an intermediate repeater according to the invention.

The fifth embodiment is then explained with the aid of FIG. 5. FIG. 5 shows an intermediate repeater that is equivalent in its structure and its mode of operation to the intermediate repeater described in FIG. 4, with the difference that an additional two matrices MAX3, MAX4 are provided.

The matrices MAX3, MAX4, which in the simplest case are also configured as switches comparable to the switches in FIG. 3, have the job of replacing the coupler for the merging of the signal paths, since, by means of switched connections, less parasitic induction occurs compared to coupled connections. The matrices MAX3, MAX4 are triggered by the detectors DET1, DET2.

Figure 6:
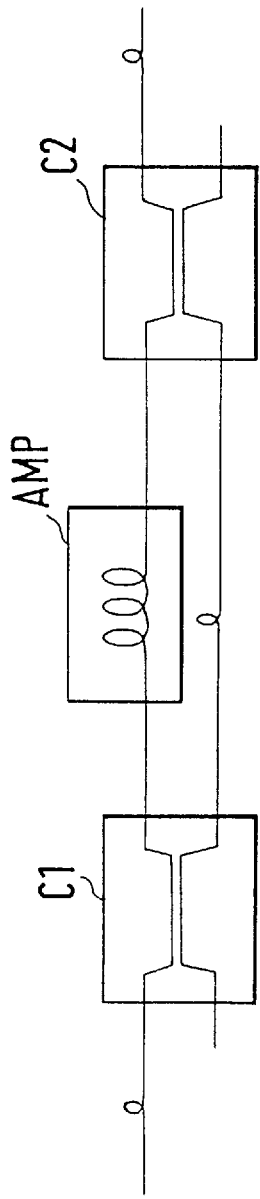
FIG. 6 is a schematic illustration of a sixth embodiment of an intermediate repeater according to the invention.

The sixth embodiment is then explained with the aid of FIG. 6. FIG. 6 shows an intermediate repeater for a communication network, as described in FIG. 1, with a broadband amplifier AMP, a first device C1 and a second device C2.

The communication network can also be configured, at least partially, for an optic transmission of optic frequency multiplexed signals. Then, optical intermediate repeaters are connected to one another through optic lines, for example, optical fiber lines. An optical intermediate repeater contains an optical broadband amplifier AMP, for example an optical fiber amplifier doped with erbium. The optical frequency multiplexed signals, for example, are made up of two signals, one broadband and one narrow band, which are transmitted with differing wavelengths; for example, the broadband signal at 1520 nm and the narrow band signal at 1330 nm.

The first device C1 is used to separate the two signals. It contains an optical coupler C1, which is a wavelength-dependent coupler. The broadband signal and the narrow band signal are thus routed in two different signal paths. In the one signal path is found the optical broadband amplifier AMP, which amplifies the broadband signal. In the other signal path is provided merely an optic line that forwards the narrow band signal without amplification.

Both signal paths can be fused together by means of a second device C2, which contains a second optical coupler C2, which is designed similar in structure to the first optical coupler, so that the broadband signal is transmitted amplified together with the non-amplified narrow band signal to the end user sites. Moreover, a transmission from the end user sites can occur without structural modification, for example using a third wavelength. Through appropriate selection of the optical couplers, the third wavelength can be conducted over the amplified signal path or over the non-amplified signal path. In a comparable way, the procedure is expandable to four or more wavelengths.

What is claimed is:

1. An intermediate repeater for a communication network for receiving and forwarding frequency multiplexed signals including broadband signals and narrow band signals, the intermediate repeater comprising:

a broadband amplifier (AMP) configured to amplify the broadband signals received at one end of the intermediate repeater and to subsequently forward the amplified broadband signals to another end of the intermediate repeater; and a first device (HP1, LP1; C1; S1; MAX1) connected in series with the broadband amplifier (AMP), wherein the first device is configured to forward the narrow band signals received at the one end of the intermediate repeater to the other end of the intermediate repeater without amplification by bypassing the broadband amplifier (AMP).

2. An intermediate repeater according to claim 1, wherein, the first device (HP1, LP1; C1) is set to separate the received narrow band signals from the received broadband signals according to frequency.

3. An intermediate repeater according to claims 1 or 2, wherein, the first device (HP1, LP1; C1) is set to execute a division of the received frequency multiplexed signals into broadband signals and narrow band signals, and a second device (HP2, LP2; C2) is included for merging together, according to frequency, the amplified broadband signals and the narrow band signals.

4. An intermediate repeater according to claim 3, wherein, the first device (HP1, LP1; C1) contains a first passive high-pass filter (HP1) that is set to forward the received broadband signals and to suppress the forwarding of the received narrow band signals, and wherein, the first device (HP1, LP1; C1) contains a first passive low-pass filter (LP1) that is set to forward the received narrow band signals and to suppress the forwarding of the received broadband signals.

5. An intermediate repeater according to claim 4, wherein, the first passive high-pass filter (HP1) and the broadband amplifier (AMP) are connected in series, and the first passive low-pass filter (LP1) is arranged parallel to the series connection of the first passive high-pass filter (HP1) and broadband amplifier (AMP), in order to forward the received broadband signals amplified and the received narrow band signals without amplification.

6. An intermediate repeater according to claim 5, wherein, the second device (HP2, LP2; C2) contains a second passive high-pass filter (HP2) that is set to forward broadband signals and to suppress the forwarding of narrow band signals, wherein, the second passive high-pass filter (HP2) is connected downstream from the broadband amplifier (AMP), and the second device (HP2, LP2) contains a second passive low-pass filter (LP2) that is set to forward narrow band signals and to suppress the forwarding of broadband signals, and wherein, the second passive low-pass filter (LP2) is connected downstream from the first passive low-pass filter (LP1).

7. An intermediate repeater according to claims 1 or 2, wherein, the broadband signals contain distribution signals and the narrow band signals contain bi-directional signals, and wherein, the broadband amplifier (AMP) is a unidirectional amplifier.

8. An intermediate repeater according to claim 7, wherein the distribution signals contain cable television signals and/or video signals and the bi-directional signals contain voice and/or data signals.

9. An intermediate repeater according to claim 1, wherein a second device (S2;MAX2) is provided that is connected downstream from the broadband amplifier (AMP) and works together with the first device (HP1, LP1; C1; S1; MAX1) such that switching can be done back and forth between at least two varying signal paths, whereby the broadband amplifier (AMP) is looped into one of the two signal paths.

10. An intermediate repeater according to claim 9, wherein the first device (HP1, LP1; C1; S1; MAX1) contains a first switch (S1), which is equipped such that, with connection of a power supply on the intermediate repeater, the received frequency multiplexed signals are routed to a signal path that includes the broadband amplifier (AMP) and, in the event of failure of the power supply, automatically routed to another signal path.

11. An intermediate repeater according to claims 9 or 10, wherein, a detector (DET) is provided, in order to monitor at least one output signal of the broadband amplifier (AMP), and that the detector (DET) is set, in the event of a detected operational disturbance of the broadband amplifier (AMP), to give a control signal to the first switch (S1), in order to have it switch the received frequency multiplexed signals to a signal path that does not include the broadband amplifier (AMP).

12. An intermediate repeater according to claims 9 or 10, wherein, the broadband amplifier (AMP) is a bi-directional amplifier, the broadband signals contain bi-directional video signals and/or data signals, and wherein, the narrow band signals contain bi-directional voice and/or data signals.

13. Intermediate repeater according to claims 1 or 2, wherein the broadband amplifier (AMP) is an optic amplifier, and the first device (C1) contains a first optic coupler (C1) that is set to forward the received broadband signals and the received narrow band signals in two different optic signal paths.

14. An intermediate repeater according to claim 13, wherein the second device (C2) contains a second optic coupler (C2) that is linked to the first optic coupler (C1) such that two signal paths are made available, wherein the broadband optic amplifier is located in one of the two signal paths (AMP) and an optic line is located in the other of the two signal paths.

15. An intermediate repeater for receiving and forwarding frequency-multiplexed signals that include broadband signals and narrow-band signals, the intermediate repeater comprising:

first means for amplifying the broadband signals received at one end of the intermediate repeater and for subsequently forwarding the amplified broadband signals to another end of the intermediate repeater; and second means for forwarding the narrow-band signals received at the one end of the intermediate repeater to the other end of the intermediate repeater without amplification by bypassing the first means, wherein the second means are connected in series with the first means.

16. An intermediate repeater, comprising:

an amplifier configured to amplify broadband signals received at one end of the intermediate repeater and to subsequently forward the amplified broadband signals to another end of the intermediate repeater; and a first arrangement configured to forward narrow-band signals received at the one end of the intermediate repeater to the other end of the intermediate repeater by bypassing the amplifier.

17. The intermediate repeater according to claim 16, wherein the first arrangement is configured to separate the broadband signals from the narrow-band signals.

18. The intermediate repeater according to claim 16, further comprising a second arrangement configured to merge the amplified broadband signals with the narrow-band signals.

19. The intermediate repeater according to claim 16, wherein the first arrangement comprises:

a high-pass filter configured to forward the broadband signals received at the one end of the intermediate repeater to the other end of the intermediate repeater and configured to prevent the narrow-band signals received at the one end of the intermediate repeater from being forwarded to the other end of the intermediate repeater; and a low-pass filter configured to forward the narrow-band signals received at the one end of the intermediate repeater to the other end of the intermediate repeater and configured to prevent the broadband signals received at the one end of the intermediate repeater from being forwarded to the other end of the intermediate repeater.

20. The intermediate repeater according to claim 16, wherein the first arrangement comprises:

a high-pass filter series-connected to the amplifier; and a low-pass filter parallel-connected to the series-connected high-pass filter and amplifier.

* * * * *